May 7, 1963 K. G. BRUNBERG ETAL 3,088,999

CIRCUIT ARRANGEMENT FOR CONTROLLING CROSS-BAR SELECTORS IN A TELEPHONE SYSTEM

Filed March 14, 1960 9 Sheets-Sheet 1

INVENTORS:
KARL GUNNAR BRUNBERG
ROLF AUGUST DAHLBLOM
BERNHARD LILLSUNDE
BY: Hane and Nydick
ATTORNEYS May 7, 1963 K. G. BRUNBERG ETAL 3,088,999

CIRCUIT ARRANGEMENT FOR CONTROLLING CROSS-BAR SELECTORS IN A TELEPHONE SYSTEM

Filed March 14, 1960 9 Sheets-Sheet 2

INVENTORS:
KARL GUNNAR BRUNBERG
ROLF AUGUST DAHLBLOM
BERNHARD LILLSUNDE
BY: Hane and Nydick
ATTORNEYS May 7, 1963 K. G. BRUNBERG ETAL 3,088,999

CIRCUIT ARRANGEMENT FOR CONTROLLING CROSS-BAR SELECTORS IN A TELEPHONE SYSTEM

Filed March 14, 1960 9 Sheets-Sheet 3

INVENTORS:
KARL GUNNAR BRUNBERG
ROLF AUGUST DAHLBLOM
BERNHARD LILLSUNDE
BY: Hane and Nydick
ATTORNEYS May 7, 1963 — K. G. BRUNBERG ETAL — 3,088,999

CIRCUIT ARRANGEMENT FOR CONTROLLING CROSS-BAR SELECTORS IN A TELEPHONE SYSTEM

Filed March 14, 1960 — 9 Sheets-Sheet 4

INVENTORS:
KARL GUNNAR BRUNBERG
ROLF AUGUST DAHLBLOM
BERNHARD LILLSUNDE
BY: Hane and Nydick
ATTORNEYS May 7, 1963 K. G. BRUNBERG ETAL 3,088,999

CIRCUIT ARRANGEMENT FOR CONTROLLING CROSS-BAR SELECTORS IN A TELEPHONE SYSTEM

Filed March 14, 1960 9 Sheets-Sheet 5

INVENTORS:

KARL GUNNAR BRUNBERG
ROLF AUGUST DAHLBLOM
BERNHARD LILLSUNDE

BY: Hane and Nydick

ATTORNEYS

INVENTORS:
KARL GUNNAR BRUNBERG
ROLF AUGUST DAHLBLOM
BERNHARD LILLSUNDE
BY: Hane and Nydick
ATTORNEYS INVENTORS:
KARL GUNNAR BRUNBERG
ROLF AUGUST DAHLBLOM
BERNHARD LILLSUNDE
BY: Hane and Nydick
ATTORNEYS INVENTORS:
KARL GUNNAR BRUNBERG
ROLF AUGUST DAHLBLOM
BERNHARD LILLSUNDE
BY Hane and Nydick
ATTORNEYS INVENTORS:
KARL GUNNAR BRUNBERG
ROLF AUGUST DAHLBLOM
BERNHARD LILLSUNDE
BY: Hane and Nydick
ATTORNEYS 3,088,999

CIRCUIT ARRANGEMENT FOR CONTROLLING CROSS-BAR SELECTORS IN A TELEPHONE SYSTEM

Karl Gunnar Brunberg, Segeltorp, and Rolf August Dahlblom and Bernhard Lillsunde, Hagersten, Sweden, assignors to Telefonaktiebolaget L M Ericsson, Stockholm, Sweden, a corporation of Sweden Filed Mar. 14, 1960, Ser. No. 14,859
Claims priority, application Sweden Mar. 26, 1959
7 Claims. (Cl. 179—22)

The present invention relates to a circuit arrangement for restoring bridges in an automatic telephone system equipped with selectors of the cross-bar type, in which the bridges are maintained in contact closing state by a continuously operative force even when the connection has ceased and in which restoring or setting up respectively is carried out by means of an operating current impulse supplied to the bridge.

The problem of restoring idle bridges which after the end of the conversation connection are held in contact closing position occurs, for instance, in a selector of cross-bar type, known as a code-relay selector. In the code-relay selector the bridge magnet operates one or more contact groups which determine the output direction and are maintained in contact closing position by means of a continuously operative force, such as a spring force, and the bridge obtains current only in order to allow by its operation that new contact groups selected by operating means and determining the new output direction are closed instead of the earlier closed contact groups. The telephone system comprises a marker which identifies a calling line and connects it to a called line through idle-marked bridges which are chosen by the marker, by testing test wires, each belonging to a bridge and by their marking indicating the occupied or idle state of the respective bridge. The purpose of the invention is to determine by means of the marker not only which bridges are idle and which are occupied but also which of the idle bridges are restored or not respectively and to restore by means of the marker the last mentioned immediately after the ceasing of the speech connection or latest upon the next functioning of the marker.

The circuit arrangement according to the invention is substantially characterized by the fact that one of the outputs defined by operation of the contact groups being ineffective from the point of view of speech connection corresponds to the restored or rest position of the bridge and operates a home position contact defining two alternative testing paths, one for restored bridges and another for set up bridges, in such manner that the marker upon testing the bridges determines which of the idle bridges are restored or not and connects a current of short duration to the last mentioned in order to restore the same.

Figure 1:
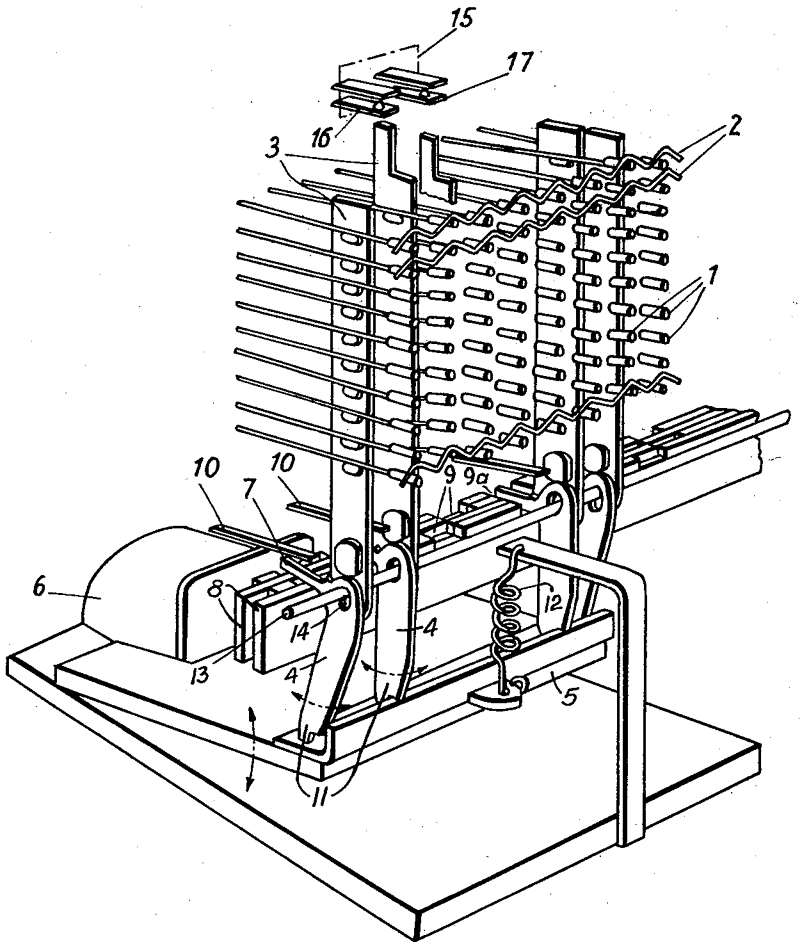
Figures 2, 3, 4:
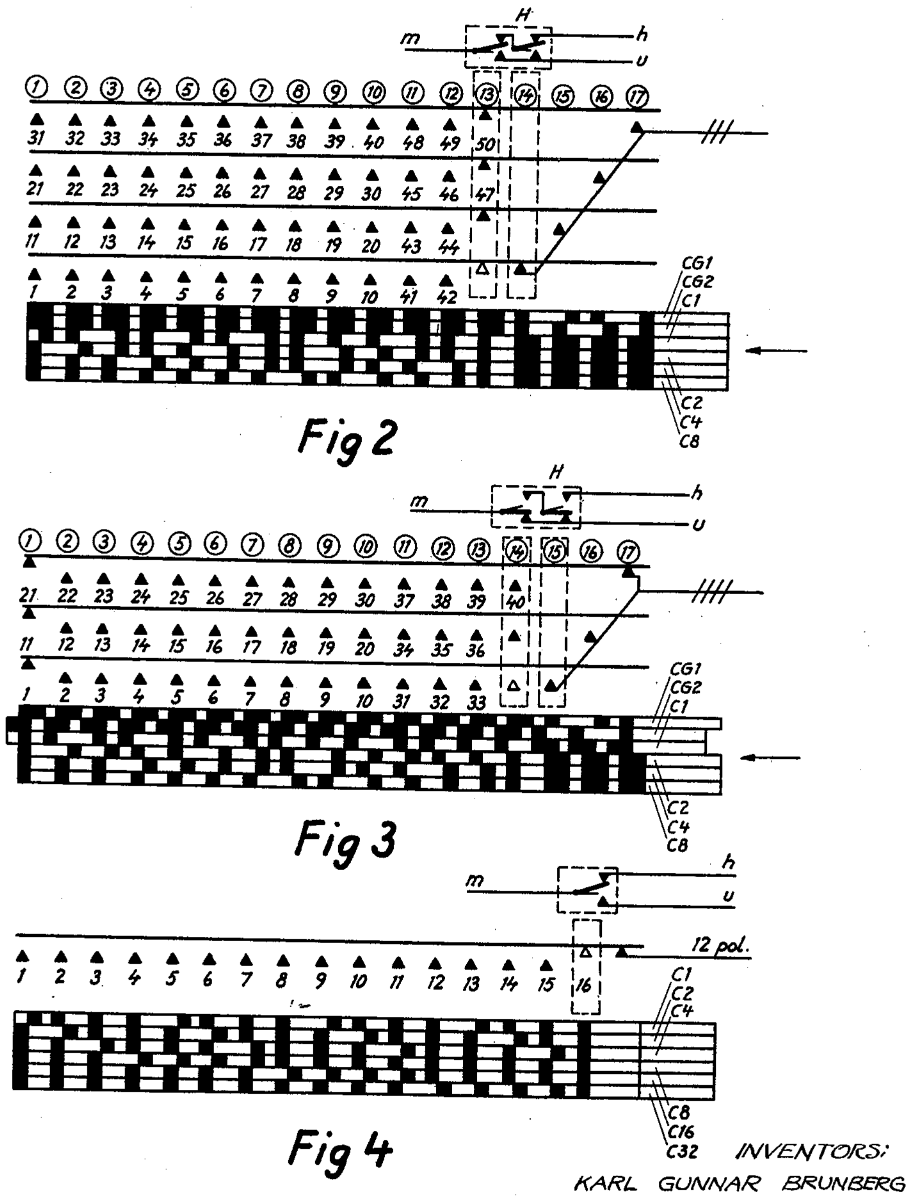
Figure 5:
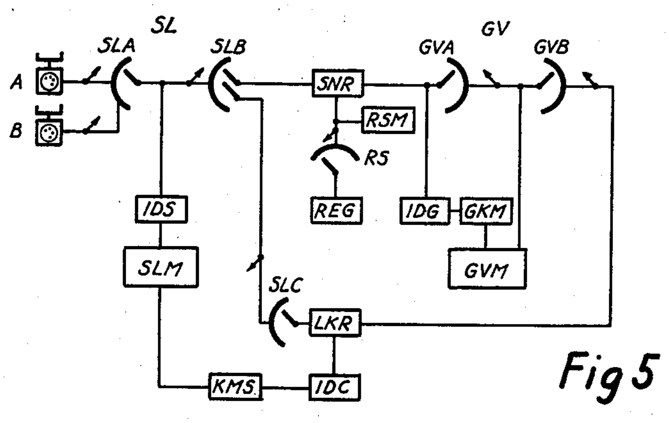
Figure 9:
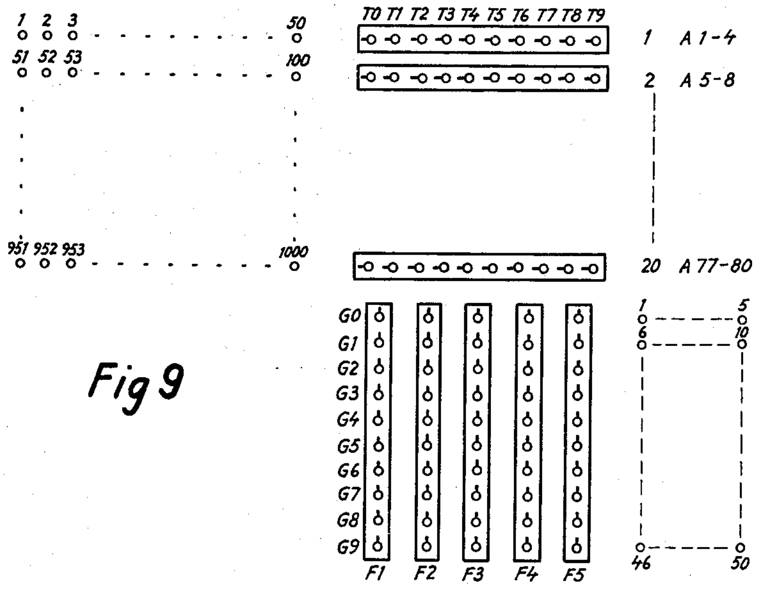
Figure 6:
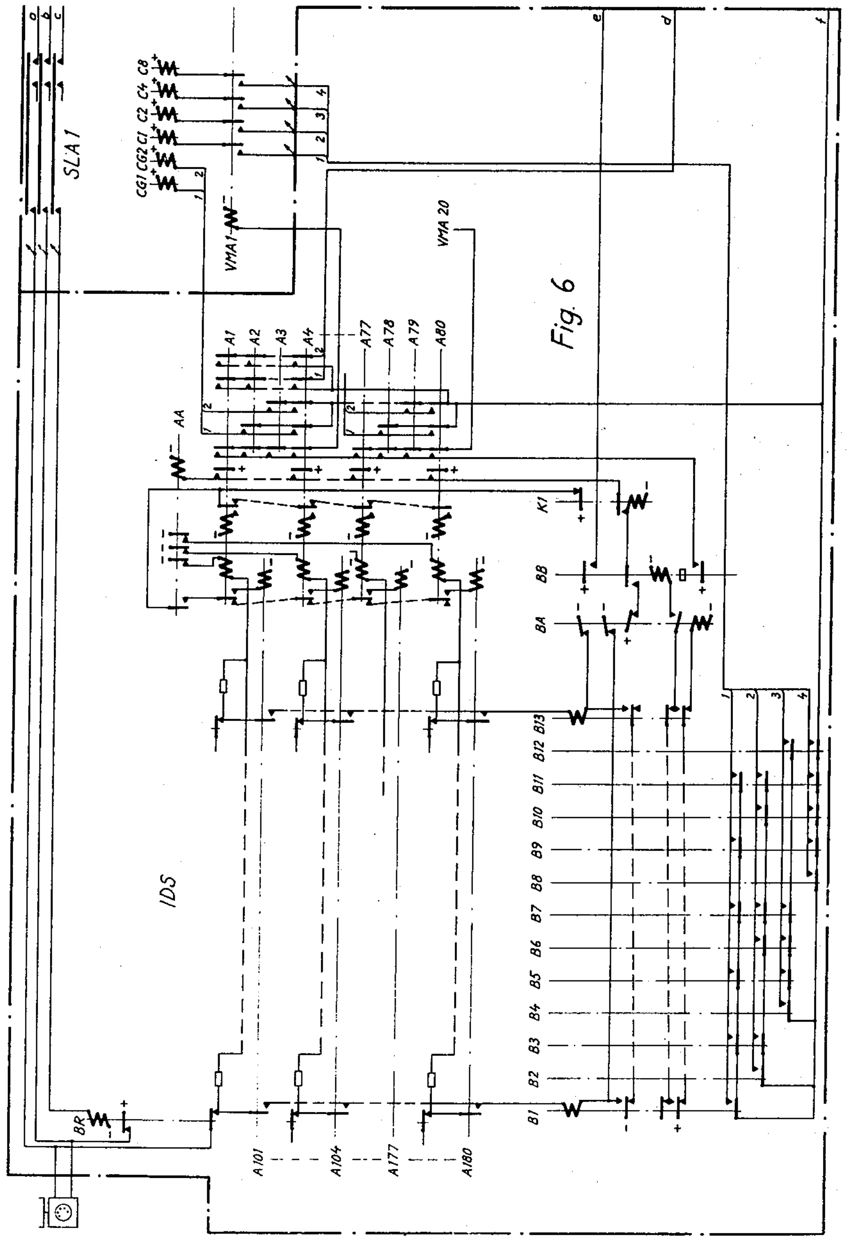
Figure 7:
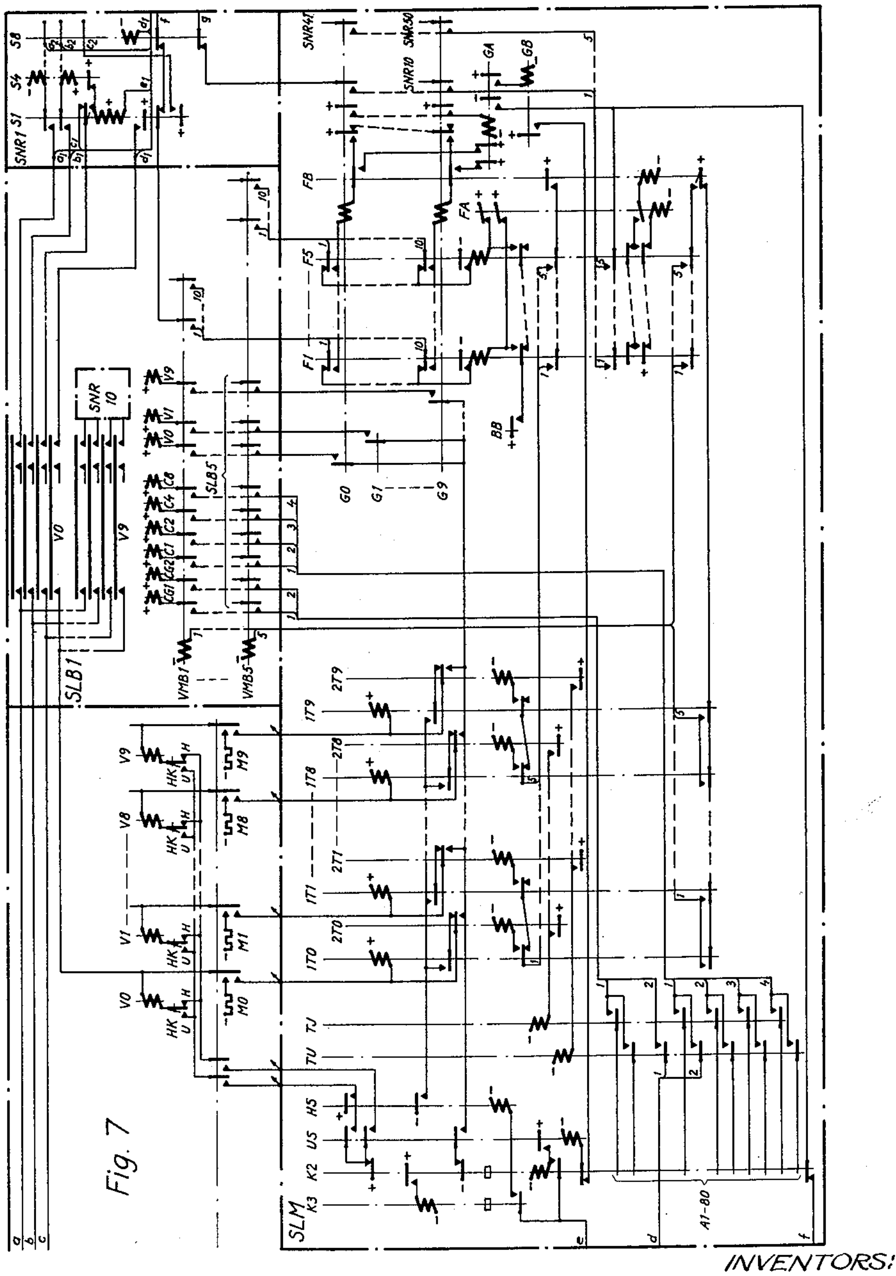
Figure 8:
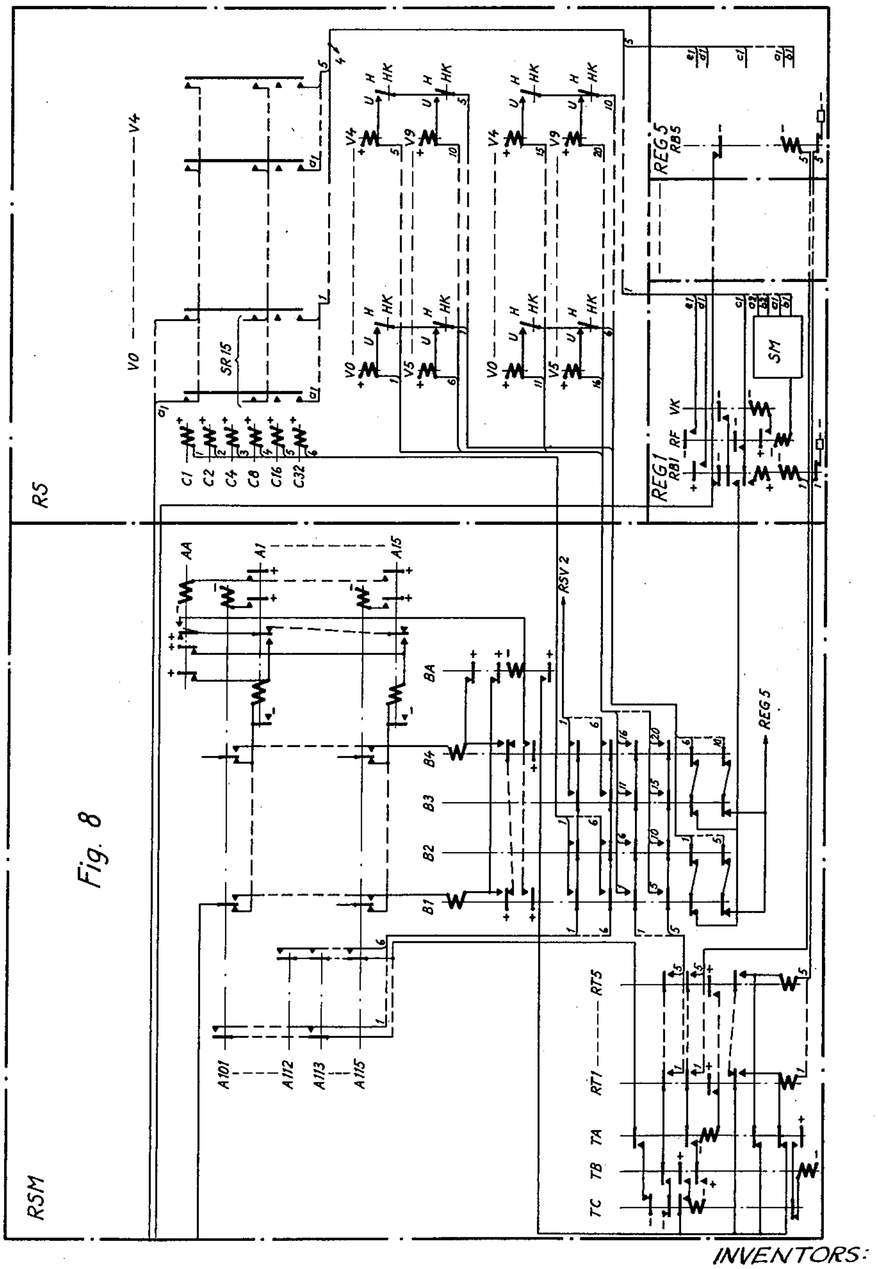
Figure 10:
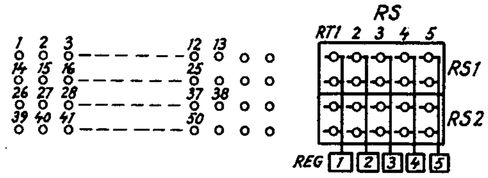
Figure 13:
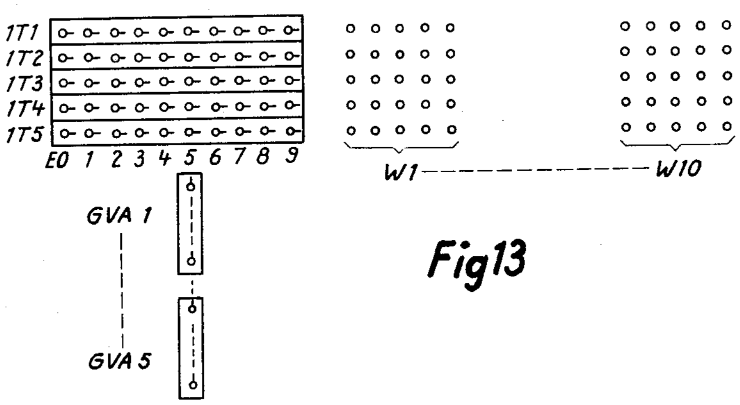
Figure 11:
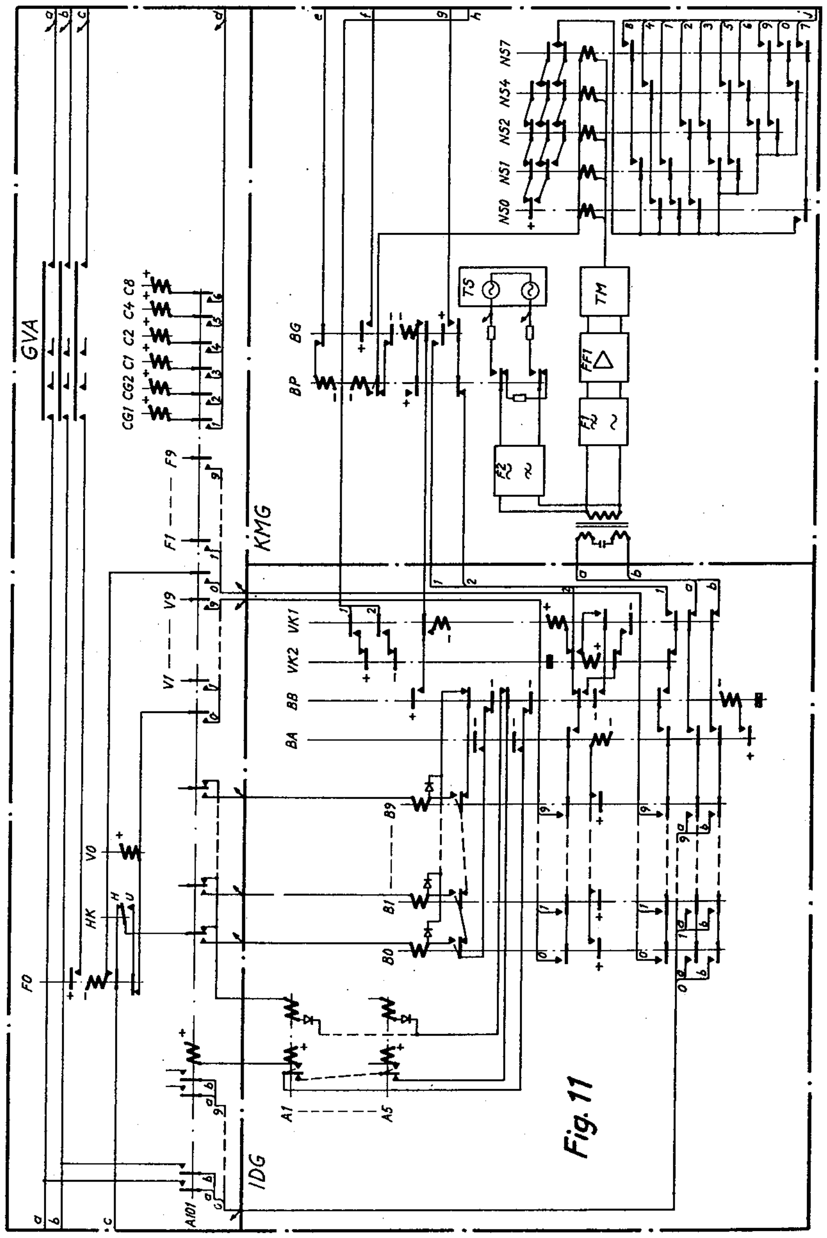
Figure 12:
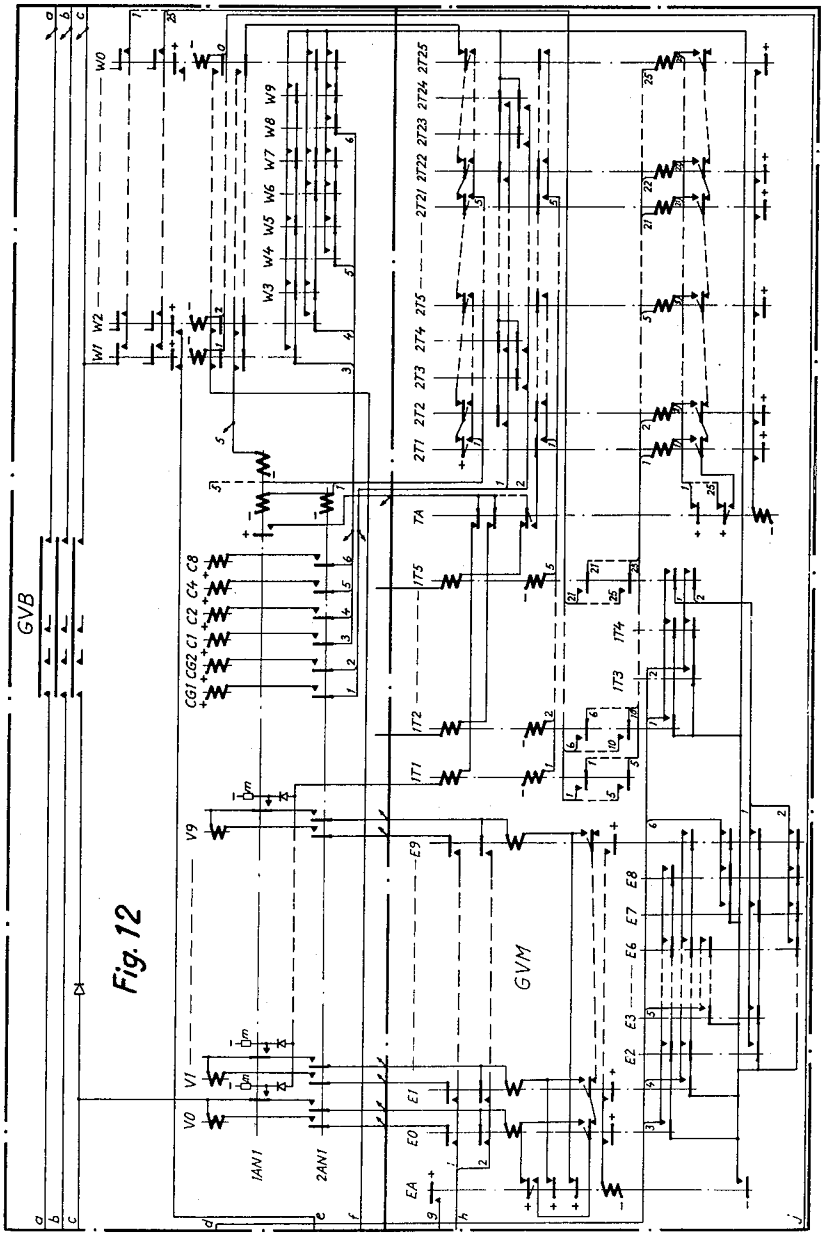

The invention will be explained more in detail by means of some embodiments with reference to the enclosed drawings in which:

FIG. 1 shows diagrammatically a code-relay selector bridge,

FIGS. 2–4 are showing the grouping of the contacts and the shape of the code-bars when the connections comprise a different number of wires, FIG. 5 shows a diagram of a telephone exchange comprising code-relay selectors, FIGS. 6–8 show more detailed circuit diagrams of a telephone exchange upon application of one of the embodiments of the invention, according to which the bridges are restored upon the next operation of the marker, FIGS. 9–10 show the grouping of the bridges in said exchange, FIGS. 11–12 show a detailed circuit diagram of the group selector stage in the telephone system according to FIG. 1 upon application of another embodiment of the invention, according to which the bridges are restored immediately after the ceasing of the conversation connection, and FIG. 13 shows a grouping diagram for the bridges in the group selector stage.

FIG. 1 shows diagrammatically a code-relay selector, more exactly a bridge-unit, a number of units, for example ten, being combined to a selector. The contacts 1 are arranged in parallel rows and upon operation may be brought in contact with a bar 2 extending parallel to each contact row. The contacts being in alignment transverse to the bars 2, the so-called vertical rows, are operated simultaneously so that an incoming line, the conductors of which are connected to the contacts of a certain vertical row, can be connected through the bars to an outgoing line, the conductors of which are connected to the contacts in another vertical row, by simultaneously operating both said contact rows. In order to control all the contacts in a vertical row at the same time, an operating means is provided for each vertical row, comprising a lifting bar and a crank-shaped lever 4, which can be rocked by the armature 5 of a bridge magnet 6 and which by means of the lifting bar 3 presses the contacts of the respective row against the conducting bars. The levers can be rocked freely only when one of the lever arms 7 is not prevented in its movement by code-bars 8. Said code-bars are formed by parallel strips which by means of code-magnets (not shown) are longitudinally displaceable from a rest position to an operated position. The strips are provided with recesses 9 in such manner that upon displacement of certain strips and maintaining certain strips in rest position continuous recesses **9*a* are formed below a selected vertical row, depending on which of the code-magnets are operated. Only those of the levers can rock, one arm 7 of which can freely pass through a continuous recess 9*a* upon rocking when pressed into said recess by means of a spring 10. The armature 5 of the bridge magnets prevents however such a rocking movement when it is not operated as it engages the lower arm 11 of the levers. When the bridge magnet operates, at least two levers can be rocked by the spring 10, so that when the current to the bridge magnets is interrupted and the armature 5 is returned to rest position by a restoring spring 12, the arms of the rocked levers will come into engagement with the armature. In this way the levers, which are supported on a shaft 13, extending through a longitudinal opening 14** in the lever, will be displaced so that also the lifting bars belonging to the levers will be displaced and will close the vertical contact rows belonging to the same.

Operation of the code-bars is effected by code-magnets not shown in FIG. 1. FIGS. 2–4 show diagrammatically the grouping of the contacts when establishing connections comprising three, four, or twelve conductors. In the drawing three, four, or twelve contacts, respectively, are indicated by a single contact symbol for the sake of clarity. At the same time, in the lower part of each figure the position of the recesses 9 of the code-bars is indicated by black areas, said recesses allowing operation of the respective vertical row. According to the embodiment, there are seventeen vertical contact rows and six code-bars. In FIG. 2 the contacts are grouped in such manner that each of the vertical rows 1–13 comprise four contact groups each having three contacts while each of the vertical rows 14–17 comprises one contact group having three contacts, in different horizontal positions, connected in parallel to the three-conductor input. By operating simultaneously one of the rows 14–17 and one of the rows 1–13 an input can be connected theoretically to 4 x 13 outputs, as is easy to see. In order to operate the vertical rows 14–17 for so-called contact row selection two code-bars CG1 and CG2 are used while for operating the vertical rows for so-called "number" selection 4 code-bars C1, C2, C4, C8 are used. It appears from FIG. 2 that if, for example, the output 11 has to be connected to the input, the contact row selection bar CG1 and the number bar C1 must be operated. FIG. 3 shows similarly as FIG. 2 a grouping for connecting a 4-conductor input to theoretically 3 x 14 4-conductor outputs by means of 6 code-bars. FIG. 4 shows the grouping of a 12-conductor connection of an input to theoretically 16 outputs by means of 6 code-bars. Upon the setting up at first the code-bars are operated in order to prepare operation of the bridge, that is, to allow rocking of the two selected lever arms. It appears clearly from FIGS. 2–4 that upon operating suitable code-bars continuous-recesses are formed below two required vertical rows. FIGS. 2 and 4 show the selectors in inoperative state while FIG. 3 shows the selector set up the output 21 in which case the code-bars CG2 and C1 are operated.

It is possible as well practically as theoretically not to restore the two operated levers and the associated contact row to rest position after the end of the conversation but to operate upon the next call two other levers which when the bridge the next time is operated and released respectively change place with the levers operated before so that two other vertical contact rows are closed. It can however be necessary from the point of view of connection to bring the bridge into rest position before the next setting up is carried out in order to eliminate that for example back current paths occur through the operated but in conversation no longer occupied contacts. The structure of the code-relay selectors is such that also in this rest position or home-position two levers are operated, though said two levers do not cause any connection as in the other cases. On one hand it is required to have the same spring tension of the restoring springs 12 and the same position of the armature 5 as in the other positions, on the other hand it will be possible in this manner to make use of the rest position for operating a home-position contact in a simple way, which marks the set up or restored condition of the bridge, respectively. The home-position levers are operated when all the code-bars are in rest position as they in this position can freely rock into the recesses 9*a* of the code-bars. The home-position contact is operated mechanically by the two home position lifting bars, the function of which both is the condition of the closing of the home-position contact. According to FIG. 1 the home position contact 15 consists of two contact members 16 and 17, each of which is operated by its own lifting bar and which contact members are connected in series in such manner that upon the function of both lifting bars a circuit will be interrupted while upon the function of only one of said lifting bars a current can pass. The home-position contact 15 can of course consist of a single contact mechanically affected by the two lifting bars together and interrupted only if both lifting bars are operated.

In FIGS. 2–4 the home-position contact is diagrammatically shown. According to FIG. 2 there are continuous recesses below the vertical rows 13 and 14 if none of the code bars is operated (the shown position). If this position the input is connected to the lowest contact group in the vertical row 13 which is not connected to any output and is indicated by a white contact symbol. In this position the home-position contact is affected in such manner that it completes a circuit from the conductor $h$ to the conductor $m$, which circuit as will be explained later, is used for setting up idle bridges. When the vertical row 13 or 14, respectively, is operated together with some of the other vertical rows, the input is always connected to an outgoing line. In this condition a restoring circuit is completed from the conductor $u$ to the conductor $m$. Correspondingly to FIG. 2, in the grouping according to FIG. 3 the home-position contact is operated if the vertical rows 14, 15 are operated at the same time. In FIG. 3 is however indicated a position in which the vertical row 17 is operated simultaneously with the vertical row 1 so that a normal outgoing connection is obtained. The restoring circuit is completed and the setting up circuit is interrupted, that is, the conductor $m$ is connected with the conductor $u$ as appears clearly from FIG. 3. According to FIG. 4 the vertical row 16 will close the home-position contact. The function of this arrangement should be clear in view of the above mentioned.

FIG. 5 shows a circuit diagram of a telephone exchange comprising code-relay selectors. As is clear, the main parts of the exchange or the position of them does not differ fundamentally from what is usual in a telephone exchange comprising usual cross bar selectors. In order to explain the idea of the invention it is however important to show the cooperation between the different means participating in the setting up function. Upon a call a subscriber A is connected to an identifier IDS of a marker SLM, the subscriber is identified, after which the marker connects the subscriber through idle selector stages SLA and SLB to an idle link circuit relay set SNR and through the latter and through a register finder RS to an idle register REG. The dialling impulses of the subscriber are stored in REG which thereafter calls the identifier IDG in the following selector stage GV. The identifier IDG identifies the input and connects it to the code-receiver GKM which receives necessary number of digit information and connects the GVM-marker to the connection. GVM sets up a free path by means of the digit information obtained and calls thereafter the identifier IDC of the SLC-stage. The identifier IDC identifies the input and connects the code-receiver KMS to SNR. KMS receives a suitable number of digits from the register and calls the SLM-marker. The latter selects a free path by means of the digit information obtained and sets up the connection through an incoming line equipment LKR, through the SLC stage and through the SLB- and SLA-stages to the B-subscriber.

FIGS. 6–8 show a modified circuit diagram of an automatic telephone system working with code-relay selectors on which system the principle of the invention has been applied. The code-relay selectors can be of the type shown in FIGS. 2–4 having seventeen vertical rows and twelve contacts in each vertical row. Upon an outgoing call a subscriber A lifts his handset and completes the subscriber loop to the line equipment in the exchange so that the subscriber will be connected to the identifier. A group of subscribers, for instance, a thousand, are served by one identifier and one marker according to the embodiment. Supposing that the contact grouping according to FIG. 2 is used, in which an input can be connected to fifty outputs, there will be twenty selectors necessary for 1000 subscribers. The identifier consists of a system of horizontal and vertical conductors, to each of which a relay is connected. There are altogether eighty horizontal conductors, to which the relays A1–A80 are connected corresponding to the 4 x 20 rows of the twenty selectors and thirteen vertical rows with the relays B1–B13 corresponding to the thirteen vertical contact rows of the selectors. Each subscriber is connected to his own crossing point in the system in a manner known per se. When the crossing point obtains plus potential owing to the fact that the subscriber is lifting the handset, at first the relay belonging to the horizontal row, for example A2, will operate, if we suppose that the subscriber having number 11 and connected to the selector 1 has lifted his handset. The relays A have two windings, an operating winding and a holding winding, the purpose of which will be explained later. Secondarily to the relay A2 the relay AA will operate which interrupts the potential for the operating windings of all other A-relays, so that only one A-relay can be operative at the same time. The relay AA completes a current path through the contact of relay A2 to the relay 102. The relays A101–A180 are secondary relays of the relays A1–A80 and have the purpose to connect the vertical conductors to the B-row. Only one of the relays A101–A180 can be maintained operative at the same time. With the operation of the relay A102 calling polarity is connected from the subscriber to the vertical conductor belonging to the subscriber so that a corresponding B-relay, in this case B1, is operating. Then the relay BA, which is a steady current relay, will release and supply a potential to the B-row. By the releasing of the relay BA the potential to all the B-relays, except to B1, is interrupted, which last mentioned is holding itself through its own contact. As an A-relay and a B-relay have operated the subscriber is identified. The relay BB is operating second to the relay B1 and its purpose is to connect through the contact of the relay A1 operating polarity to one of twenty connecting relays VMA1–20, which connects up the selector, in this case selector 1, to the multiple of which the subscriber belongs. As mentioned before, when using selectors having fifty outputs for every bridge, there will be necessary twenty selectors for one thousand subscribers with minimum one bridge in each. Owing to the multiplying there are however a number of bridges, for example, ten in each selector. As the contact groups are arranged in four horizontal rows according to FIG. 2, the number of the selector, to which the subscriber belongs, will define which four relays of the 80 A-relays will operate. If, for example the subscriber belongs to the first selector (see FIG. 9) SLA1, some of the relays A1–A4 will operate and so on. The purpose of the relay VMA1 is to connect upon its operation test wires of all the bridges in SLA1- to the marker. As a test wire, a conductor connected to the bridge magnet is used, contrary to usual cross bar selectors where the occupied condition is marked by means of a contact on the bridge. The test wires can have two different conditions. When the bridge is idle, there is no potential on the test wire, but when the bridge is occupied, there is plus potential. The marker comprises a number of test relays, in this case, ten 1T0–1T9 corresponding to the number of bridges in a selector. The relay VMA1 connects the test relays to the test wires and simultaneously to minus potential through the resistances M0–M9. The test relays corresponding to idle bridges operate with minus through the resistances as the test wire is free from potential, while the test relays corresponding to occupied bridges do not operate as the plus potential of the test wire short-circuits the winding.

The cooperation between the bridges in the SLA- and SLB-selectors appears from FIG. 9 in which the grouping of the bridges is shown. As mentioned before, there are twenty SLA-selectors cooperating with a suitable number of SLB-selectors. In as well the SLA- as the SLB-selectors there are ten bridges. When supposing that the B-bridges have forty outputs each in view of the 4-conductor connection shown in FIG. 3, each B-bridge can reach two bridges in each of the twenty A-selectors. The B-bridges are multiplied in such manner that the bridges of the same B-selector have common outputs; in other words the ten bridges in each B-selector can reach the forty bridges which in the twenty A-selectors are divided into two adjacent vertical rows. It is also clear from the above mentioned that twenty A-selectors cooperate with five B-selectors.

After the marker has determined which A-bridges are free, it investigates that of the B-bridges which can cooperate with the idle SLA-bridges are idle. Through contacts of the idle and thus operated testing relays 1T a potential is connected to connecting relays VMB1–5 belonging to the SLB-selectors which may come into question. It can be stated that basically each SLB-bridge belongs to a link circuit relay set SNR so that testing of idle SLB-bridges implies testing of idle link circuit relay sets SNR. All the link circuit relay sets, of which there are fifty according to the embodiment, are connected through the contacts of the relays VMB1–5 to five relays F1–F5 each corresponding to an SLB-selector and to the ten link circuit relay sets respectively belonging to each selector. If there is at least one idle link circuit relay set SNR belonging to an SLB-selector, the F-relay corresponding to the selector operates with minus polarity from a busy-relay RB in some of the idle registers and through break contacts of the ready-relay S1 and of the busy-marking relay S8 in some of the idle link circuit relay sets. If more link circuit relay sets belonging to different SLB-selectors are idle, the F-relays corresponding to the selectors will operate and one of them will respond when the relay FA releases. Thereupon, the relay FB which has operated second to the relay FB connects another relay chain G0–G9 to the ten link circuit relay sets which belong to the chosen B-selector. One of said link circuit relay sets is chosen in such manner that one of the G-relays operates and disconnects the other link circuit relay sets. Now one of the F-relays and one of the G-relays is operative so that the link circuit relay set and consequently also the SLB-bridge is determined. Hence, the two vertical bridge rows of the selectors A according to FIG. 9 are also determined. As of the forty bridges in said two vertical rows only those two bridges can be reached by the subscriber which are in the selector of the subscriber, a selection must be carried out between said two bridges if both are idle. The F-relay belonging to the responding SLB-selector connects operating plus to one or two secondary test relays, for example 2T0–2T1, through contacts of the operated primary SLA-test relays, for example 1T0–1T1. One of the secondary relays operates and prepares a current path for operation of the respective SLA-bridge.

A register REG has to be selected which will be connected to the link circuit relay set. This is carried out in such a manner that the SLM-marker calls the register finder marker RSM through the link circuit relay set SNR, by means of minus through a make contact of the relay GA and of the operated relays F and G. The register finder marker RSM comprises an identifier and according to the embodiment five test relays RT1–RT5 for testing so as to find an idle register among the five registers REG1–5 being at disposal. The identifier is constructed for identifying fifty inputs and it is a normal 1-conductor identifier with crossing horizontal and vertical conductors, to fifteen horizontal conductors of which the relays A1–A15 are connected, while to four vertical conductors the relays B1–B4 are connected. Said grouping depends on the position of the contacts in the RS-selectors as will be explained herebelow. Upon a call from a link circuit relay set, for example SNR1 belonging to a certain crossing point, at first the A-relay A1 belonging to the horizontal conductor will operate and switch all the calling circuits belonging to said conductor to the B-relays. Of the B-relays only one belonging to respective vertical row, in this case B1, can operate and in this manner the link circuit relay set is identified. After the identifying plus polarity is connected from a make contact of the BA-relay through the test relays RT1–5 to the registers REG1–5 which are idle and consequently have minus polarity on the break contact of the relay RB. The test relays RT1–5 which are connected to idle REG-registers will operate and as they are connected in a break-out chain and the operating circuit through the relay TA, which has operated secondarily to the relays RT, has been interrupted so that only one of the test relays can hold itself; hence the register will now be determined. It remains now only to set up the RS-bridge belonging to the chosen REG, to the chosen SNR. The operation of the bridge has to be prepared by operation of the code-bars and thus of the code-magnets in the same manner as has been carried out in the case of the selected SLA- and SLB-bridges. The relays A and B in the SLM-identifier and in the RS-identifier respectively determine which of the code-magnets have to be operated.

According to the embodiment it has been supposed that the subscriber A11 has called which requires that in the SLM-identifier the relays A2 and B1 are operated. As it appears from FIGURE 2 it is necessary for connecting up the subscriber A11 that the code-bars CG1 and C1 are operated. Through a make contact of relay A2 the relay CG1 is operated and through a make-contact of the relay B1 the code-magnet C1 is operated by means of minus from a make contact of the relay GA. Corresponding to the bridge selected, for example SLA1, the output 81 in the selected SLB-bridge has to be pointed out which is carried out in such manner that code-magnets CG2 and C1 are operated as is easy to understand by means of FIG. 3. Also said code-magnets obtain minus polarity from the contact of the operated GA-relay through contacts of the operated A2-relay and a contact of the relay TU which has operated after to the operated relay 2T1. The latter has operated subsequently to the test relay 1T1 of the selected A-bridge as mentioned before. Depending on whether odd or even test relays T operate, the relay TU or TJ is operated. The explanation is that a B-bridge can alternatively cooperate with two A-bridges according to the grouping plan in FIG. 9.

The code-magnets of the RS-selectors are operated in a similar manner. According to the grouping plan in FIG. 10, the RS-selectors consist of 2 code-relay selectors each having ten bridges divided into two bridge rows and fifteen outputs comprising twelve-conductors in each bridge as shown in FIG. 4. As appears the inputs of four bridges situated in a vertical row are connected to the register belonging to respective vertical row and in said manner each of the 5 registers can be connected to 60 outputs, of which only 50 are used according to the embodiment. Supposing that the bridge SLB0 has been pointed out, the relays A1 and B2 have operated in the RS-identifier and the code-magnets have to be operated in such manner that the output 1 in the RS1-selector is pointed out, that is, the code-magnet C1 is operated. The current path is going through the contact of the relay TA which has been operated by the operation of the relay RT, through contacts of the A- and B-relays to the code-magnet C1. The contacts of the relays B1, B2 or B3, B4, respectively, determine whether the code-magnets of the selector RS1 or RS2 have to be operated. According to the embodiment (see FIG. 4) only the code-magnet C1 is operated.

After the code-magnets have been set up in the selectors SLA and SLB also in the selector RS, the bridges can be brought to operation which is carried out by supplying a current of short duration to the bridge magnets. Operation of the bridge A is carried out by minus potential through a make contact of a setting-up relay US (which has operated with plus polarity from the relay GB which latter in turn has operated secondarily to the relay GA), a make contact of the secondary test relay 2T1, a make contact of the connecting relay VMA1, the winding of bridge magnet V1, the home-position contact and the make contact of the relay US to plus potential. In dependence on whether the home-position contact HK is in the position U correspondng to the set up position of the bridge, or in the position H corresponding to the restored position of the bridge respectively two alternative current paths are obtained, the purpose of which will be explained later on in connection with the restoring of the bridges. The B-bridges are similarly operated from the make contact of the relay US through a make contact of the operated G-relay and through a make contact of the relay VMB1. The current to the code-magnets is interrupted as soon as the bridges have obtained the operation impulse due to that the relay K2 operates subsequently to US. The relay K2 interrupts the current for US so that the operating current to the bridges ceases.

Operation of the bridges in RS is carried out in such manner that the relay TB (which has operated subsequently to the relay TA which in turn has operated subsequently to the operation of the relay RT) connects minus potential to the selected RS-bridge through the contact of a B-relay which determines the horizontal row in which the bridge is situated according to FIG. 10 and through the contact of a relay RT which determines in which vertical row the selected bridge is situated. The relay TB operates the relay TC which in turn disconnects the paths for TB so that the latter releases and interrupts the current to the bridge. By operation of the relay TC the current to the code-magnets is also interrupted. After the setting up has been carried out, the busy-relay RB of the register is held through the $c1$- or the $c$-conductor respectively through the winding of the BR-relay of the subscriber, which hereby operates and releases the marker.

After the setting up, the marker has information about which bridges are idle in the used A-selector due to the fact that the test relays 1T0–1T9 of all the idle bridges are operated. Furthermore the marker has information about which bridges have been set up as the corresponding secondary test relay, in the present case 2T1, has operated. After the code-magnets have been restored, the restoring relay HS operates subsequently to K3 which latter has operated subsequently to K2 after the interruption of the operating current of the bridges and of the code-magnets. The relay MS connects minus to all the idle-marked bridges except to the bridge just being set up as the current path of the last mentioned is interrupted at the contact of the secondary relay 2T1. Furthermore the relay HS connects simultaneously with said minus also plus polarity to the home-position contacts of all the bridges but only the set up bridges, the home-position contacts of which are in U-position, obtain plus potential and operate by means of the minus potential already connected to the other terminal of the winding, so that all the idle but not restored bridges will be restored. The relay HS is released as soon as the marker is released.

The restoring of the RS-bridge is carried out in the following manner: As mentioned before the register is held through the $c$-wire and through the link circuit relay set from the cut-off relay BR of the subscriber (assuming that the subscriber loop is completed). The register receives dialling impulses from the subscriber and occupies the following selector stages to the B-subscriber, correspondingly to the digits dialled. When all the selector stages are set up, the signal receiver SM in REG receives a signal from the last selector stage, indicating that the setting up is completed. The ready-signal influences the relay RF in the register. The relay RF operates and causes operation of the relay S1 in SNR through the wire $e1$. The relay BR is maintained operative from the relay S1 and the relay RB is maintained operative from a contact of the relay RF. In this way REG has completed its task and it has to restore the set up RS-bridge before the latter can be used again. Subsequently to the relay RF the relay VK is operating. Its purpose is to connect minus potential to the set up bridge in order to restore it. The condition is however that none of the code-magnets in the selector in question is operative. As operation of the code-magnets is carried out through contacts of the B-relays, the B-relays gives a possibility to control whether some of the code-magnets is operated or not. The current path from the contact of the relay VK is extending through a make contact of RB and on one hand through a row of break contacts of B1 and B2 and on the other hand through a row of break contacts of B3 and B4, so that the home-position contacts of the two bridges in the vertical rows of the respective selectors obtain minus polarity. The condition is that only one bridge is set up and this condition is fulfilled as the register is served only by one bridge at the time. Only one home-position contact can be in set up position of course and only the bridge belonging to the lastest operative REG can obtain a restoring current. The bridge will operate through the home-position contact and all the connections through the RS-selector will cease. By releasing of the VK-relay the current to the bridge magnet will be interrupted so that the bridge is restored to home-position.

As mentioned before the invention can be applied also when the restoring has to be carried out immediately after the bridge becomes idle, for example in the group selector stage in a telephone system of the type shown in FIG. 5.

FIG. 13 is showing a grouping plan for the bridges in a group selector stage GVA, GVB in the telephone system according to FIG. 5. 50 link circuit relay sets SNR are connected to the inputs of 50 GVA-bridges which are situated in 5 GVA-selectors each having 10 bridges. The connection comprises 3 conductors so that according to the above-mentioned 50 outputs can be used in every bridge. The fifty outputs of the bridges of the GVA-selectors are multiplied through all the bridges so that they can reach the inputs of fifty GVB-bridges. The GVB-bridges have also fifty outputs each, and ten bridges belonging to the same selector have their outputs multiplied so that altogether $5\times5=250$ outputs are obtained.

FIGS. 11–12 show a more detailed circuit diagram of the group selector stage. When the register has obtained sufficient digit information it is calling the GVA-selector which is directly connected to the link circuit relay set SNR. This is carried out in such manner that REG connects plus polarity to the *c*-wire of the GVA-input. Said calling-plus causes a call to the identifier IDG which is constructed as a known one-wire identifier, in which a plurality of horizontal and vertical conductors are connected to their respective identifying relays A and B. To each crossing point belongs an incoming line and at first an A-relay will operate corresponding to the horizontal conductor and switch the current paths to the relays of the vertical conductors, of which only one B-relay will operate corresponding to the vertical conductor, to which the line belongs. The conductor *c* extends through the home-position contact HK of the bridge, the purpose of which in connection with the restoring of the bridge will be explained later on. By operation of an A-relay and a B-relay the incoming line is identified. According to the embodiment there are fifty inputs and for identifying them there are five A-relays belonging to the horizontal conductors and ten B-relays belonging to the vertical conductors. For example the line 1 will be identified by operation of the relays A1 and B0. At first the relay A1 which cooperates with the bridges of the first selector, obtains operating potential from the line. The relay operates and holds itself through its own contact with minus potential from a break contact of the relay BB. Secondarily the relay A101 operates and switches the operating potential from the line to the relay B0 which also operates. Secondarily to the relay B0 the relay BA operates which in turn causes operation of the relay BB. Through contacts of the relays A101, B and BA, the incoming line is connected to a code-receiver KMG which receives and stores digit signals from the register and sends answer signals to the register. The signalling between the register and KMG can be carried out by an arbitrary signal system. According to the embodiment it is assumed, however, that voice frequency signalling is used. Voice frequency signalling between a sending and a receiving means in a telephone system is known, for example, from Swedish Patent 122,189, for which reason no further explanation about the principle is necessary.

As shown diagrammatically, KMG comprises a voice frequency receiving portion TM which through a filter F1 and an amplifier FF1 obtains digit signals with two of five frequencies whereby two of five voice frequency sensitive relays are operated and they cause in turn operation of 2 of the relays NS 0, 1, 2, 4 and 7. After that a sufficient number of digit information has been received by KMG the direction of the via is determined. The two hundred fifty outgoing lines are according to the embodiment divided into ten directions and each bridge in each selector can reach lines in each via. Corresponding to the via, one of ten relays W1–10 is operated when the direction is determined by the digit information. When supposing that the first digit is sufficient for determining the via and the first digit was 1, the relay W1 will operate. At first a group test is carried out in order to determine in which selectors there is at least one idle bridge. Subsequently to the via-relay W1 the connecting relays 1AN1–1AN5 of all the B-selectors have operated. Said connecting relays connect each of their ten test-wires from the respective five selectors to five group-test relays 1T–1T5 of which those will operate which have at least one idle bridge in their selector as in this case they obtain minus polarity through a resistance. If all the bridges in a selector are occupied, the test wires of all the bridges have plus polarity so that the test relay belonging to said selector is short-circuited and cannot operate. The relay W1 has connected the test wires of all the twenty-five lines, belonging to the line-test relays 2T1–2T25 through contacts of the operated group test relays 1T1–1T5. If an outgoing line is free, there is minus polarity on the test wire and the line test relays corresponding to idle selectors S and an idle line will operate. The relay TA operates subsequently to the operated line test relays, interrupts the operating current paths of the latter and connects holding plus polarity through a selecting relay chain so that for example relay 2T1 is selected to operate. In this manner the plus polarity to the operating windings of the connecting relays 1AN1–5 is interrupted through the break contacts of the relays 2T1–2T25, but at the same time plus polarity is connected to a holding winding of the connecting relay 1AN1 belonging to the selected selector through a make contact of the broken out 2T1-relay. At the same time a further connecting relay 2AN1 of the chosen selector is operating with the same plus in order to connect the ten bridges of the selector to ten individual-test relays E0–E9 for selecting a bridge in the selector. Owing to the fact that as earlier mentioned, an occupied B-bridge has plus potential on the test wire while an idle bridge has no potential, the winding of the individual-test relay will be short-circuited for each occupied bridge while the test relay of an idle bridge can obtain current from the intern minus polarity through a resistance *m*. Consequently the E-relays corresponding to idle bridges will operate and for example the relay E0 is selected to operate which relay is holding itself through a make contact of the relay EA. In this way the GV-bridge and the line is determined. By operation of the relay W1, plus polarity has been connected to KMG in order to signal to the register that the selection of the via has been carried out and that the digit sending can continue. Said plus polarity causes in KMG operation of the relay BP which connects a voice frequency sender TS in KMG to the filter F2 in order to send answer signal to the register through the conductors *a* and *b*. Subsequently to the relay BP the relay BG operates and interrupts the current path of the operating winding of the relay BP. The relay BP is however holding itself through its own contact as long the sending of the first digit continues after which it will be released while the relay BG will hold itself through its own contact from the relay BB in IDG . As long the relay BG is operated, the minus polarity is disconnected from the receiving relays NS0–NS7.

After that the GVB-bridge has been determined the code-magnets in the GVA- and GVB-selectors have to be operated. In the GVA-selector this is carried out by means of the E-relays which point out the individual-code-magnets C1, C2, C4 and C8 and by means of the 1T-relays which point out the code-magnets CG1, CG2 for contact row selection. The GVA-bridge has to be set up corresponding to the selected GVB-bridge as appears from the grouping diagram in FIG. 3. According to the embodiment the individual-code-magnet C1 in the GVA-selector is operated by means of minus from the make contact of the relay EA through the contact of the operated E0-relay, and no code-magnets for contact row selection will be operated as the output 1 according to FIG. 2 has been selected in the GVA-selector. The code-magnets in the GVB-selector are operated with the same minus polarity: the individual-code-magnets C1, C2, C4, C8 through contacts of the via relays W1–10 and the code-magnets for contact row selection CG1, CG2 through the contacts of the operated line test relays 2T1–2T25. According to the embodiment the individual-code-magnet C1 in the GVB-selector operates through a make contact of the W1-relay. By means of minus polarity from a contact of the operated EA-relay and through contacts of the relays BG and BP, the relay VK1 in IDG operates and connects minus polarity through contacts of the relays VK2, BB and BA and through the contacts of the operated A- and B-relays to the bridge magnet VA0 of the GVA-bridge for operation, upon which the contact HK interrupts the incoming *c*-wire to IDG. Through a similar current path as the bridge magnet VA0, the busy relay F0 of the GVA-bridge operates by means of plus potential from a make contact of the relay BG and through contacts of the relays VK1, VK2, BB, BA and A. The relay F0 holds itself through its own make contact from plus on the incoming *c*-wire and supplies plus to the input of the GVA-bridge which after setting up the A- and B-selectors busy-marks the selected outgoing line. The relay VK1 also connects operating potential to the selected GVB-bridge VB0 through the operated E0-relay and the relay 2AN1. Subsequent to the relay VK1 the relay VK2 operates and interrupts the potential as well to the A- as to the B-bridge so that the contacts pointed out by the code-magnets are closed. The bridges are now set up and the connection is set up through the GVA- and GVB-selectors. By interrupting the *c*-wire to the identifier the calling plus to the identifier also has ceased. The relays B, BA, BB, A release so that IDG releases, the relay BG in KMG releases subsequent to the relay BB so that KMG is released and by releasing of the KMG the relays W1, 1AN, 2AN, 1T1, 2T1, E0 and EA release, so that GVM is released. The relay F0 is holding itself during speech connection from SNR through the *c*-wire with plus through its own contact and it maintains in turn calling plus on the *c*-wire in the calling direction. When the speech connection is finished, the holding plus disappears and the relay F0 releases.

As explained before the bridge and the identifier obtain calling plus through the home-position contact HK to which the *c*-wire is connected. This is however possible only if the home-position contact is in home-position H as in the set up position U the calling current path is interrupted and another current path is formed through the U-position of the home-position contact which current path is used for causing a restoring call as soon as the speech connection is interrupted. As explained before the home-position contact remains in U-position after the bridge has become free and in this position it connects plus polarity from a conductor individual for the bridge, according to the embodiment through the bridge magnet winding to the normal calling wire of the bridge in the identifier, so that the identifier obtains calling plus through a break contact of the F-relay and through the U-contact exactly in the same manner as if the call would come from the calling wire *c* belonging to the bridge input. The relays A and B corresponding to the identity of the bridge will operate as explained before. There is no difference between the identifying of an incoming call and the identifying of a non-restored idle bridge and the breaking out among the waiting calls and the waiting bridges is carried out in sequence. Also the BA- and BB-relays operate exactly in the same manner upon the identifying of a bridge as upon the identifying of an incoming call. The difference relatively to the identifying of a normal call consists therein that the relay VK1 now can operate immediately after the operation of the relay BA as a current path is found to VK1 from minus on the make contact of the relay BA, the winding of the relay B, switching contact of A101, the contact U, break contact of the relay F0, contact of the relay A101, and contacts of the relays B, BA, BB (which is slow operating and could not yet operate). The relay VK1 operates and then the relay BB. Operating minus is connected to the bridge magnet through the contacts of the relays VK1, VK2, BB, BA, B and A. According to the embodiment the bridge magnet VA0 has not been operated until now as both the A- and B-relays have so high resistance values that it cannot operate in series with any of them. Only when VK1 operates and connects "pure" minus polarity to the bridge the latter can operate. The relay VK2 operates subsequently to VK1 and interrupts the operating potential to the bridge so that it will be restored, that is, the contacts which do not give an outgoing connection are operated owing to the fact that the code-magnets are not operated. When the bridge is restored, the home-position contact is also switched from U-position to H-position so that the calling path disappears, the identifier is released and the bridge can be called again from the incoming wire in usual manner.

We claim:

1. A circuit arrangement for restoring cross-bar type selector bridges in an automatic telephone system having a plurality of bridges, each having a plurality of contact groups connecting an input means thereto to one of a plurality of output means connected thereto, the contacts of a contact group which has been used in conversation being held in a closed position and being opened by momentary operation of said bridge to allow closing of a new contact group selected, in combination, comprising a marker circuit means connectable to telephone lines in said system and responsive to calling signals therein for identifying a calling line and connecting it to a called line through idle bridges, a test wire connected to each bridge having a voltage potential dependent upon the idle and occupied condition of said bridges, the closed position of a predetermined contact group defining a restored non-conducting condition of the associated, contact means responsive to the closed position of said predetermined contact group defining a restored non-conducting condition for providing alternate current paths, one current path belonging to each bridge being in restored position and another current path belonging to each bridge being in a non-restored position, said marker circuit means including means connected to said alternate current paths and to said test wires and responsive to said voltage potentials for sensing the idle condition of said bridges and for distinguishing between ones of said idle bridges in said restored condition and ones of said idle bridges in an unrestored condition, and means connected to said sensing and distinguishing means and to said bridges for energizing said ones of said idle bridges in said unrestored condition to place them in said restored condition.

2. A circuit arrangement according to claim 1 wherein said energizing means includes means for producing a current of short duration for restoring all of said idle bridges to said restored position before said marker circuit selects one idle bridge therefrom.

3. A circuit arrangement according to claim 1 wherein said energizing means includes means for producing a current of short duration for placing said idle bridges in said unrestored condition into said restored condition after said marker circuit means selects one of said idle bridges.

4. A circuit arrangement according to claim 1 wherein a calling line is associated with a definite bridge input means, means connected through one of said alternate current paths to the bridge for identifying the line upon a call and said bridge upon the termination of a call, and current producing means connected to said bridge for energizing said bridge to place said bridge in said restored condition when said one contact group is in said predetermined position and to allow setting-up of said bridge to another output means when said predetermined contact group is in another position.

5. A circuit arrangement according to claim 1, including a bridge operating circuit having two parallel branches formed by said alternative current paths, said marker circuit means including a current impulse producing means for connecting an energizing current impulse to said parallel branches to set-up said bridge independently of the set-up and restored positions thereof, and another impulse producing means for connecting a current pulse to an energizing circuit connected between unselected ones of said idle bridges and rest-position contacts of said bridges to place said bridges in said restored condition.

6. A circuit arrangement according to claim 5, including a primary and a secondary test relay for each of said bridges, said bridge energizing circuit extending through contacts of said primary and said secondary test relay of the respective bridge, each primary relay being responsive to one of said test wires having an idle-condition voltage potential, and means for selecting one of said secondary relays of said idle bridges, said one secondary relay allowing an energizing current to flow through each of said two circuits of said selected idle bridge, means for connecting an energizing current to said one secondary relay, and means for connecting an energizing circuit to said unrestored idle bridges through contacts of responsive primary relays and said unselected secondary relays.

7. A circuit arrangement according to claim 1, wherein said marker circuit means includes an identifier, said identifier including a coordinate system of conductors, in which two conductors are associated with a definite line and a definite bridge, respectively and current flows in said conductors when said identifier is connected alternatively to said line and to said bridge, respectively, a current impulse generating means connected to said bridges for energizing said bridges, two alternative current paths for energizing said current impulse generating means, one of said alternative current paths extending through contacts operated as soon as a bridge output has been selected, the other alternative current path extending through said one closed contact in its set-up position and through contacts of identifying relays connected to said line to produce an energizing current impulse as soon as a bridge has become idle and has been identified.

References Cited in the file of this patent

UNITED STATES PATENTS

| | | |
|---|---|---|
| 1,681,035 | Gardner | Aug. 14, 1928 |
| 2,479,678 | Graybill et al. | Aug. 23, 1949 |
| 2,576,785 | Donkelaar et al. | Nov. 27, 1951 |
| 2,684,405 | Bruce et al. | July 20, 1954 |